(12) United States Patent
Mizuno et al.

(10) Patent No.: US 11,876,408 B2
(45) Date of Patent: Jan. 16, 2024

(54) ELECTRIC TOOL

(71) Applicant: Panasonic Intellectual Property Management Co., Ltd., Osaka (JP)

(72) Inventors: Mitsumasa Mizuno, Osaka (JP); Akito Nakamura, Mie (JP); Koichiro Esaka, Osaka (JP); Kenji Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 17/428,922

(22) PCT Filed: Nov. 21, 2019

(86) PCT No.: PCT/JP2019/045651
§ 371 (c)(1),
(2) Date: Aug. 5, 2021

(87) PCT Pub. No.: WO2020/161900
PCT Pub. Date: Aug. 13, 2020

(65) Prior Publication Data
US 2022/0131434 A1 Apr. 28, 2022

(30) Foreign Application Priority Data

Feb. 7, 2019 (JP) ................. 2019-021028

(51) Int. Cl.
*H02K 1/276* (2022.01)
*H02K 7/14* (2006.01)
*H02K 21/16* (2006.01)

(52) U.S. Cl.
CPC .......... *H02K 1/2773* (2013.01); *H02K 7/145* (2013.01); *H02K 21/16* (2013.01)

(58) Field of Classification Search
CPC ......... H02K 1/773; H02K 7/145; H02K 21/16
(Continued)

(56) References Cited

U.S. PATENT DOCUMENTS

2003/0201681 A1\* 10/2003 Shimizu ............... H02K 1/148
310/254.1
2004/0095033 A1 6/2004 Popov
(Continued)

FOREIGN PATENT DOCUMENTS

CN 101567659 A 10/2009
CN 205829435 U 12/2016
(Continued)

OTHER PUBLICATIONS

International Search Report and Written Opinion issued in International Patent Application No. PCT/JP2019/045651, dated Feb. 4, 2020; with partial English translation.
(Continued)

*Primary Examiner* — Jose A Gonzalez Quinones
(74) *Attorney, Agent, or Firm* — Rimon P.C.

(57) ABSTRACT

An electric tool includes a motor. The motor includes a stator core and a rotor. The rotor rotates with respect to the stator core. The rotor includes: a rotor core having a circular cylindrical shape; a plurality of permanent magnets; and an output shaft. The output shaft is held inside the rotor core. The plurality of permanent magnets are arranged as spokes around a center of the rotor core.

7 Claims, 15 Drawing Sheets

(58) Field of Classification Search
USPC ....... 310/156.12, 156.15, 156.63, 156.68, 50
See application file for complete search history.

(56) References Cited

U.S. PATENT DOCUMENTS

| | | |
|---|---|---|
| 2009/0033174 A1 | 2/2009 | Niguchi et al. |
| 2009/0267546 A1 | 10/2009 | Maekawa et al. |
| 2012/0001511 A1 | 1/2012 | Matt et al. |
| 2013/0119790 A1 | 5/2013 | Gan et al. |
| 2017/0346355 A1 | 11/2017 | Nakahara et al. |
| 2018/0006512 A1 | 1/2018 | Tsuiki et al. |
| 2019/0222088 A1 | 7/2019 | Miyaji et al. |
| 2021/0203200 A1 | 7/2021 | Shiono et al. |

FOREIGN PATENT DOCUMENTS

| | | | | |
|---|---|---|---|---|
| DE | 10 2014 216555 A1 | | 2/2016 | |
| JP | 2003-319583 A | | 11/2003 | |
| JP | 2004-173491 A | | 6/2004 | |
| JP | 2009-033927 A | | 2/2009 | |
| JP | 2011-217602 A | | 10/2011 | |
| JP | 2012-105410 A | | 5/2012 | |
| JP | 2012-105543 A | | 5/2012 | |
| JP | 2012105410 A | * | 5/2012 | ............ H02K 1/276 |
| JP | 2013-013295 A | | 1/2013 | |
| JP | 2013013295 A | * | 1/2013 | |
| JP | 2015-95974 A | | 5/2015 | |
| JP | 2015-116025 A | | 6/2015 | |
| JP | 2016-103898 A | | 6/2016 | |
| JP | 2017-169402 A | | 9/2017 | |
| WO | WO2016026831 A1 | * | 2/2016 | |
| WO | WO-2016026831 A1 | * | 2/2016 | ........... H02K 1/2773 |
| WO | 2016/136384 A1 | | 9/2016 | |
| WO | 2017/209302 A1 | | 12/2017 | |

OTHER PUBLICATIONS

Extended European Search Report dated Mar. 17, 2022 issued for the corresponding European Patent Application No. 19914272.0.
Chinese Office Action and Search Report dated Aug. 1, 2023 issued in the corresponding Chinese Patent Application No. 202080046438.7, with English translation.

* cited by examiner

ELECTRIC TOOL

CROSS-REFERENCE OF RELATED APPLICATIONS

This application is the U.S. National Phase under 35 U.S.C. § 371 of International Patent Application No. PCT/JP2019/045651, filed on Nov. 21, 2019, which in turn claims the benefit of Japanese Application No. 2019-021028, filed on Feb. 7, 2019, the entire disclosures of which Applications are incorporated by reference herein.

TECHNICAL FIELD

The present disclosure generally relates to an electric tool, and more particularly relates to an electric tool including a motor.

BACKGROUND ART

Patent Literature 1 discloses an electric tool including an electric motor. The electric motor includes a stator and a rotor to rotate relative to the stator. The rotor includes a shaft, four permanent magnets, and a rotor core. The rotor core is formed in a circular columnar shape. The rotor core has four holes, which are provided at regular intervals around the circumference thereof to house the permanent magnets therein. The permanent magnets are press-fit into these holes.

CITATION LIST

Patent Literature

Patent Literature 1: JP 2015-095974 A

SUMMARY OF INVENTION

It is an object of the present disclosure to provide an electric tool facilitating shortening the diameter of its rotor.

An electric tool according to an aspect of the present disclosure includes a motor. The motor includes a stator core and a rotor. The rotor rotates with respect to the stator core. The rotor includes: a rotor core having a circular cylindrical shape; a plurality of permanent magnets; and an output shaft. The output shaft is held inside the rotor core. The plurality of permanent magnets are arranged as spokes around a center of the rotor core.

DESCRIPTION OF EMBODIMENTS

An electric tool according to an embodiment and a motor provided for the electric tool will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are all schematic representations. Thus, the ratio of the dimensions (including thicknesses) of respective constituent elements illustrated on the drawings does not always reflect their actual dimensional ratio.

(1) Electric Tool

Figure 1:
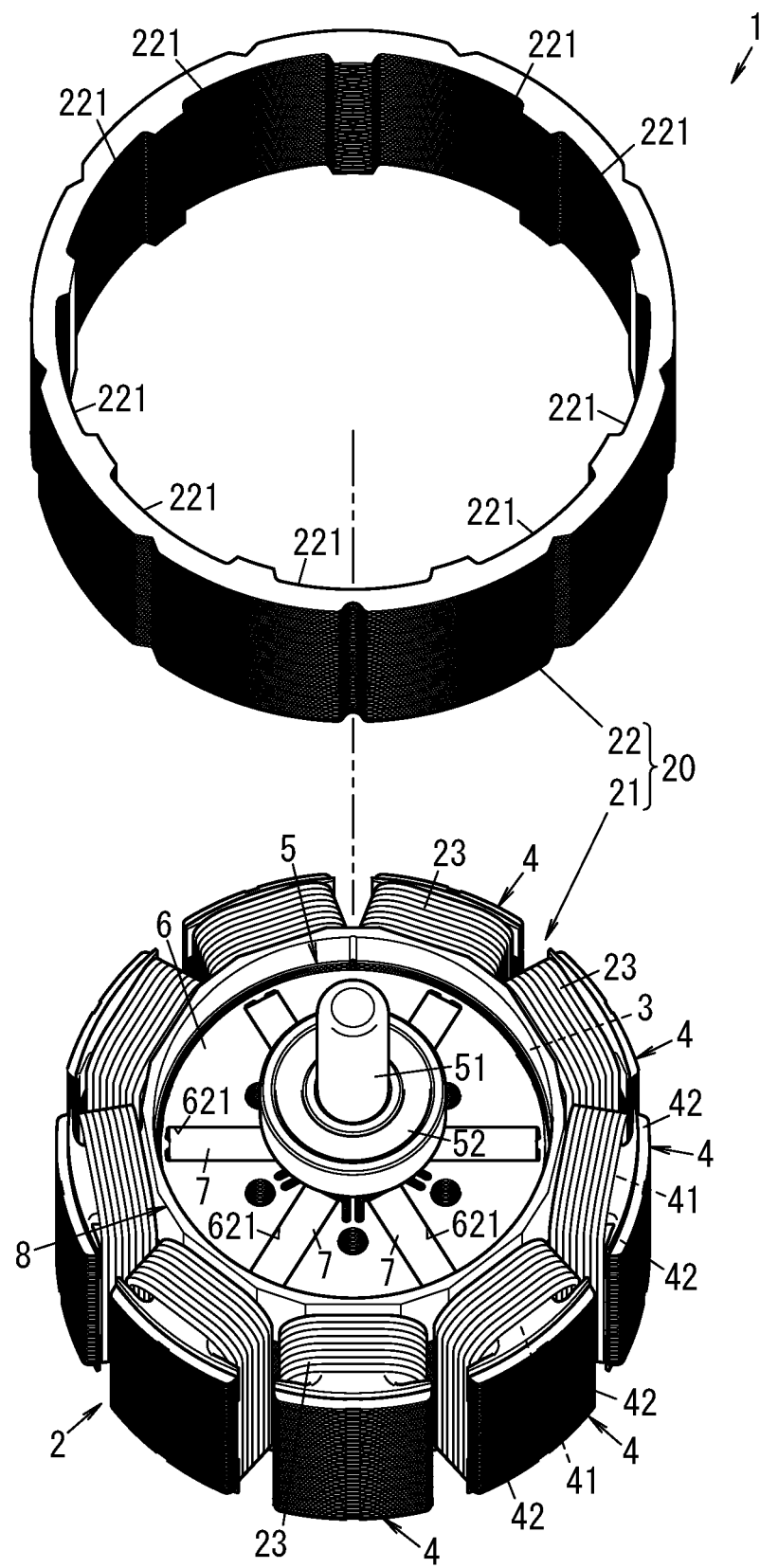
FIG. 1 is an exploded view illustrating a principal part of a motor according to an exemplary embodiment.
Figure 2:
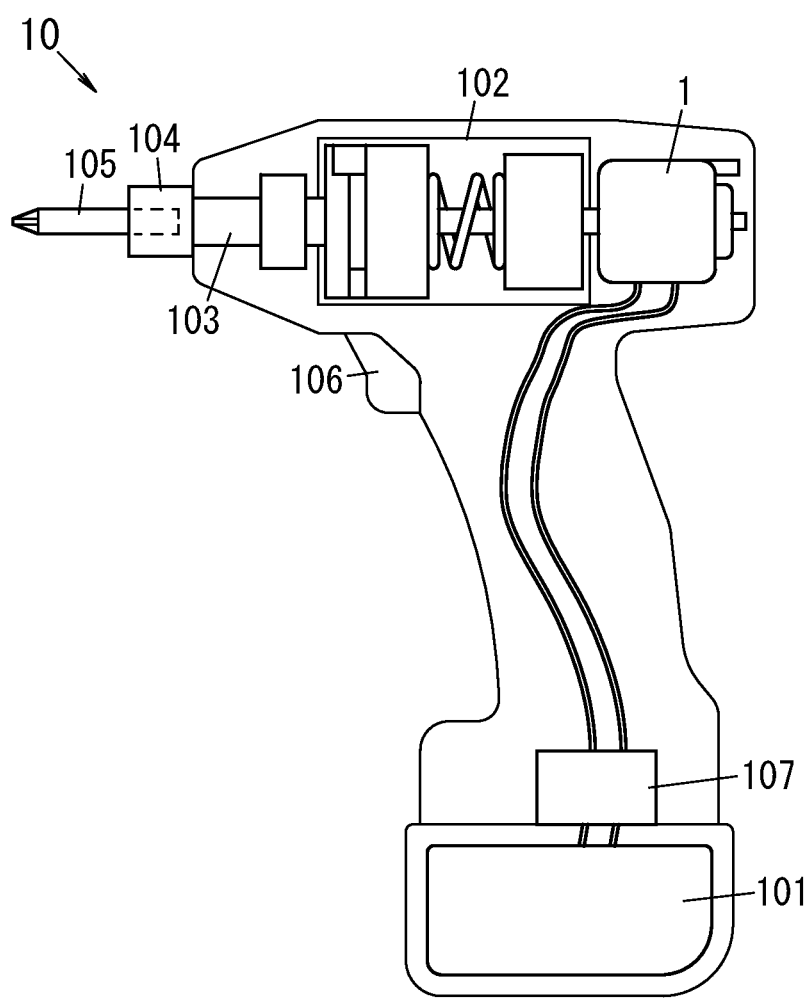
FIG. 2 is a schematic representation of an electric tool including the motor.

As shown in FIGS. 1 and 2, the electric tool 10 includes a motor 1. As shown in FIG. 2, the electric tool 10 further includes a power supply 101, a driving force transmission unit 102, an output unit 103, a chuck 104, a tip tool 105, a trigger volume 106, and a control circuit 107. The electric tool 10 is a tool for driving the tip tool 105 with the driving force of the motor 1.

The motor 1 is a driving source for driving the tip tool 105. The motor 1 may be implemented as, for example, a brushless motor. The power supply 101 is a DC power supply for supplying a current to drive the motor 1. The power supply 101 includes a single or a plurality of secondary batteries. The driving force transmission unit 102 regulates the output (driving force) of the motor 1 and supplies the regulated driving force to the output unit 103. The output unit 103 is a part to be driven (in rotation, for example) with the driving force supplied from the driving force transmission unit 102. The chuck 104 is a part fixed to the output unit 103 which allows the tip tool 105 to be attached thereto removably. Examples of the tip tool 105 (also called a "bit") include screwdrivers, sockets, and drills. One of those various types of tip tools 105 is selected depending on the intended use and attached for use to the chuck 104.

The trigger volume 106 is an operating unit for accepting a command for controlling the rotation of the motor 1. The motor 1 may be turned ON and OFF by performing the operation of pulling the trigger volume 106. In addition, adjusting the manipulative variable of the operation of pulling the trigger volume 106 allows the rotational velocity of the output unit 103, i.e., the rotational velocity of the motor 1, to be controlled. The control circuit 107 either starts or stop rotating the motor 1 in accordance with the command entered through the trigger volume 106 and also controls the rotational velocity of the motor 1. In this electric tool 10, the tip tool 105 is attached to the chuck 104. Then, the rotational velocity of the motor 1 is controlled by operating the trigger volume 106, thereby controlling the rotational velocity of the tip tool 105.

Note that the electric tool 10 according to this embodiment includes the chuck 104, thus making the tip tool 105 replaceable depending on the intended use. However, the tip tool 105 does not have to be replaceable. Alternatively, the electric tool 10 may also be designed to allow the user to use only a particular type of tip tool 105.

(2) Motor (2-1) Overview

Next, a configuration for the motor 1 will be described with reference to FIG. 1 and other drawings. The motor 1 includes a stator 2 and a rotor 5. The rotor 5 has an output shaft 51. The stator 2 includes a stator core 20 and a plurality of (e.g., nine in the example illustrated in FIG. 1) coils 23. The rotor 5 rotates with respect to the stator 2. Specifically, the magnetic flux generated from the plurality of coils 23 wound around the stator core 20 produces electromagnetic force that causes the rotor 5 to rotate. The motor 1 transmits the rotational power (driving force) of the rotor 5 from the output shaft 51 to the driving force transmission unit 102 (see FIG. 2).

The stator core 20 includes a central core 21 and an outer cylindrical portion 22. The outer cylindrical portion 22 is mounted onto the central core 21. The central core 21 includes an inner cylindrical portion 3 having a circular cylindrical shape and a plurality of (e.g., nine in the example illustrated in FIG. 1) teeth 4. Inside the inner cylindrical portion 3, the rotor 5 is arranged. Each of the plurality of teeth 4 includes a body portion 41 and two tip pieces 42. The body portion 41 protrudes outward from the inner cylindrical portion 3 along the radius of the inner cylindrical portion 3. The two tip pieces 42 extend, from a tip part of the body portion 41, in a direction intersecting with a direction in which the body portion 41 protrudes. Around the body portion 41, the coil 23 is wound via a coil bobbin 8 (see FIG. 6) to be described later.

The two tip pieces 42 are provided as a stopper for reducing the chances of the coil 23 coming off the body portion 41. Specifically, having the coil 23 caught in the two tip pieces 42 while the coil 23 is moving toward a tip part of the body portion 41 reduces the chances of the coil 23 coming off.

The rotor 5 includes a rotor core 6 having a circular cylindrical shape, a plurality of (e.g., six in the example illustrated in FIG. 1) permanent magnets 7, and an output shaft 51. The output shaft 51 is held inside the rotor core 6. The plurality of permanent magnets 7 are arranged as spokes (i.e., radially) around the center C1 of the rotor core 6 (see FIG. 3).

In this case, when viewed along the axis of the rotor core 6, the rotor core 6 has the shape of a circle. The center C1 of the rotor core 6 corresponds to the center of the circle. Each of the permanent magnets 7 has a rectangular parallelepiped shape. When viewed along the axis of the rotor core 6, each permanent magnet 7 has a rectangular shape. If the plurality of permanent magnets 7 are arranged as spokes around the center C1 of the rotor core 6, this means that when viewed along the axis of the rotor core 6, the permanent magnets 7 are arranged along the circumference of the rotor core 6 such that the longitudinal axis of each of the permanent magnets 7 is aligned with the radius of the rotor core 6.

Arranging the plurality of permanent magnets 7 as spokes around the center C1 of the rotor core 6 facilitates shortening the diameter of the rotor 5. Particularly when the number of the permanent magnets 7 provided is relatively large, this facilitates shortening the diameter of the rotor 5 while keeping the length L1 measured along the longitudinal axis of each permanent magnet 7 (see FIG. 3) long enough.

Figure 4:
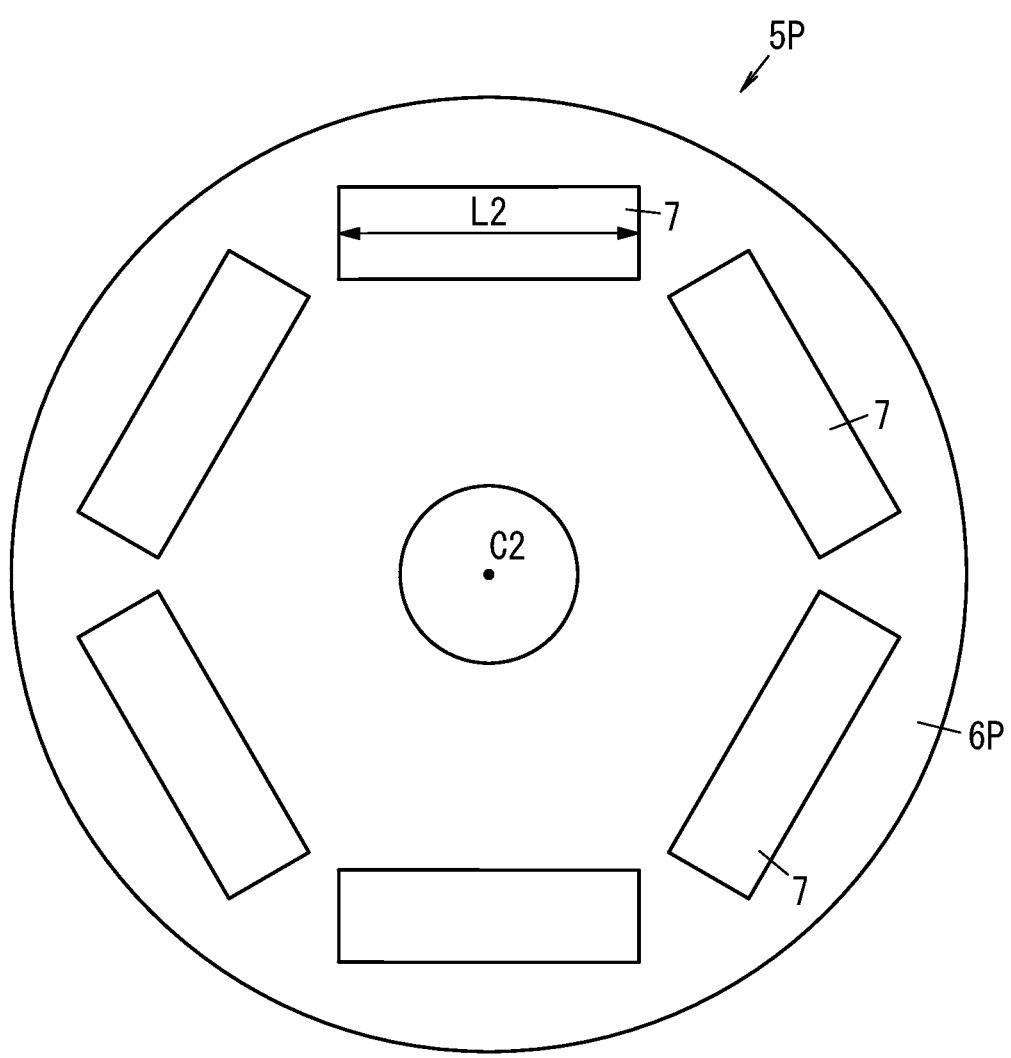
FIG. 4 is a plan view of a rotor as a comparative example for a rotor included in the motor.

For example, in a rotor 5P according to a comparative example shown in FIG. 4, a plurality of (e.g., six in the example illustrated in FIG. 4) permanent magnets 7 are arranged around the center C2 of the rotor core 6 to form a polygonal (i.e., a hexagonal) pattern. This requires, if the diameter of the rotor core 6 is constant, the length L2 measured along the longitudinal axis of each permanent magnet 7 to be shortened accordingly as the number of permanent magnets 7 provided increases. Meanwhile, this also requires, if the length L2 measured along the longitudinal axis of the permanent magnets 7 is constant, the diameter of the rotor core 6 to be extended accordingly as the number of the permanent magnets 7 provided increases. In that case, the longer the diameter of the rotor core 6 is, the greater the moment of force required to allow the rotor core 6 to start or stop its rotation becomes. Furthermore, as the diameter of the rotor core 6 is extended to increase the distance between the plurality of permanent magnets 7 and the center C2, the centrifugal force applied to the plurality of permanent magnets 7 increases accordingly, thus increasing the chances of the rotor core 6 being deformed by the force applied from the plurality of permanent magnets 7. That is why in some cases, the diameter of the rotor core 6 should not be extended.

Meanwhile, even if the number of the permanent magnets 7 provided is relatively large, the rotor 5 according to this embodiment reduces the chances of the diameter of the rotor core 6 being extended, compared to the rotor core 6 according to the comparative example. Specifically, narrowing the interval between the plurality of permanent magnets 7 along the circumference of the rotor core 6 as the number of the permanent magnets 7 provided increases still allows the plurality of permanent magnets 7 to be arranged as spokes around the center C1 of the rotor core 6. Consequently, this allows the plurality of permanent magnets 7 to be arranged with the increase in the diameter of the rotor core 6 reduced.

That is to say, the rotor 5 according to this embodiment may reduce an increase in the diameter of the rotor core 6 when the torque of the motor 1 is increased by setting the number of the permanent magnets 7 provided at a relatively large number (e.g., six or more).

(2-2) Central Core

Figure 5:
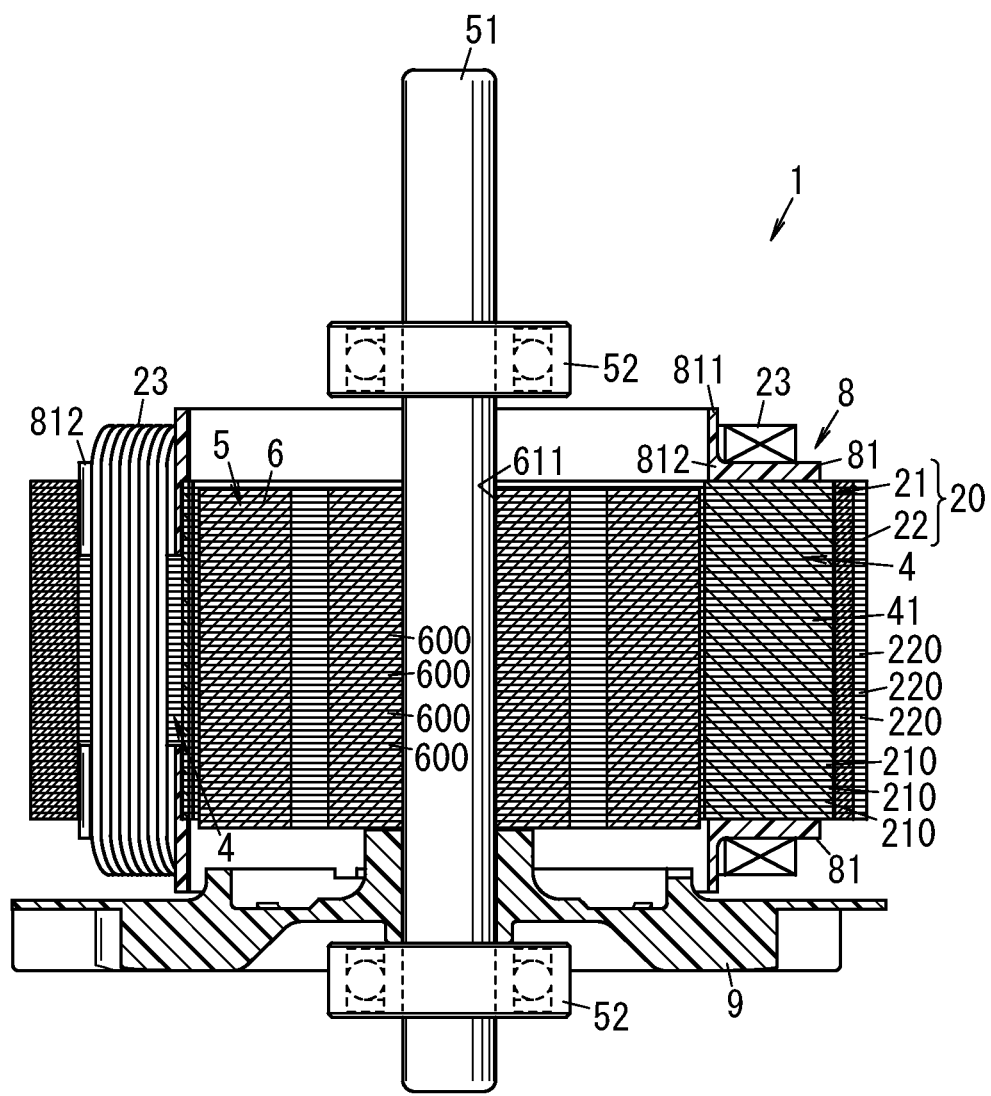
FIG. 5 is a cross-sectional view of the motor.

Next, the configuration of the stator 2 will be described in further detail. As shown in FIG. 5, the central core 21 of the stator core 20 of the stator 2 includes a plurality of steel plates 210. The central core 21 is formed by stacking the plurality of steel plates 210 one on top of another in the thickness direction. Each of the steel plates 210 is made of a magnetic material. Each of the steel plates 210 may be configured as, for example, a silicon steel plate.

Figure 6:
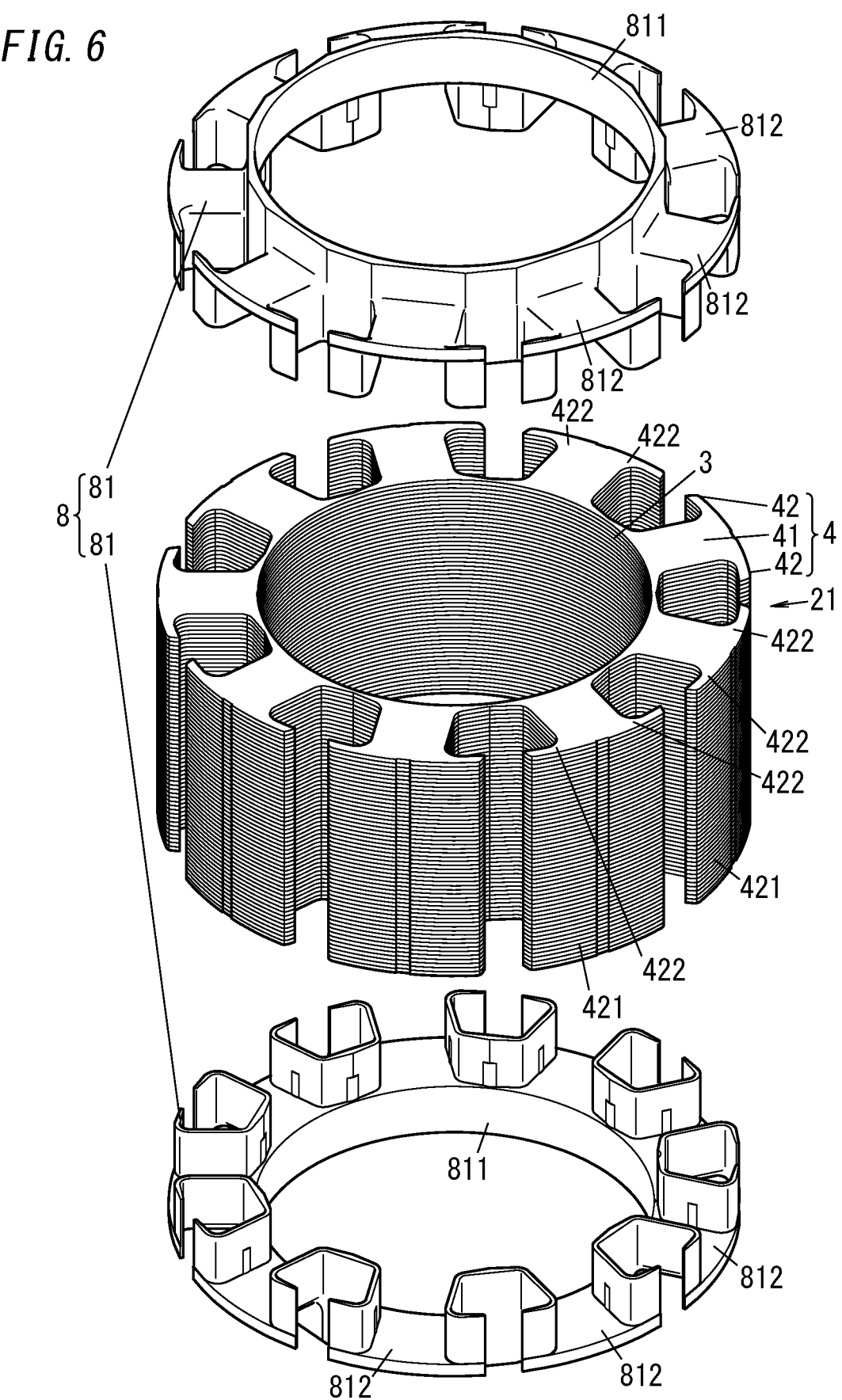
FIG. 6 is an exploded view of a central core and coil bobbin of the motor.

As shown in FIG. 6, the inner cylindrical portion 3 has a circular cylindrical shape. The axis of the inner cylindrical portion 3 agrees with the thickness of the plurality of steel plates 210. The inner cylindrical portion 3 is continuous along its circumference. In other words, the inner cylindrical portion 3 is connected along its circumference without a break.

As shown in FIG. 6, the body portion 41 of each of the plurality of teeth 4 has a rectangular parallelepiped shape. The body portion 41 protrudes outward along the radius of the inner cylindrical portion 3. The respective body portions 41 of the plurality of teeth 4 are arranged at regular intervals along the circumference of the inner cylindrical portion 3.

The two tip pieces 42 extend from a tip part of the body portion 41 in a direction intersecting with the direction in which the body portion 41 protrudes. More specifically, the two tip pieces 42 are provided on both sides along the circumference of the inner cylindrical portion 3 at the tip part of the body portion 41. In addition, the two tip pieces 42 extend along the circumference of the inner cylindrical portion 3.

Figure 7:
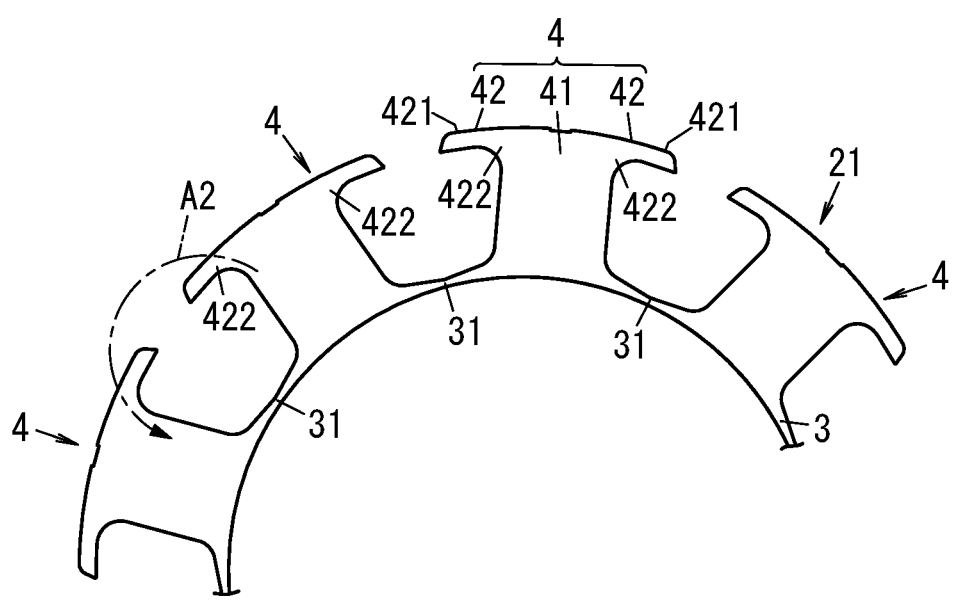
FIG. 7 is a plan view illustrating a principal part of the central core of the motor.

As shown in FIGS. 6 and 7, the surface, located closer to the outer edge along the radius of the inner cylindrical portion 3, of each tip piece 42 includes a curvilinear surface 421. When viewed along the axis of the inner cylindrical portion 3, the curvilinear surface 421 has the shape of an arc along a circle which is concentric with the inner cylindrical portion 3.

Each tip piece 42 has a curved portion 422 as a part connected to the body portion 41. The curved portion 422 is curved such that as the distance to the outer edge of the tip piece 42 decreases along the radius of the inner cylindrical portion 3, the distance from the body portion 41 increases along the circumference of the inner cylindrical portion 3. That is to say, the curved portion 422, which is a part, located at the proximal end (i.e., closer to the body portion 41), of each tip piece 42, is chamfered to have a rounded shape.

Figure 8:
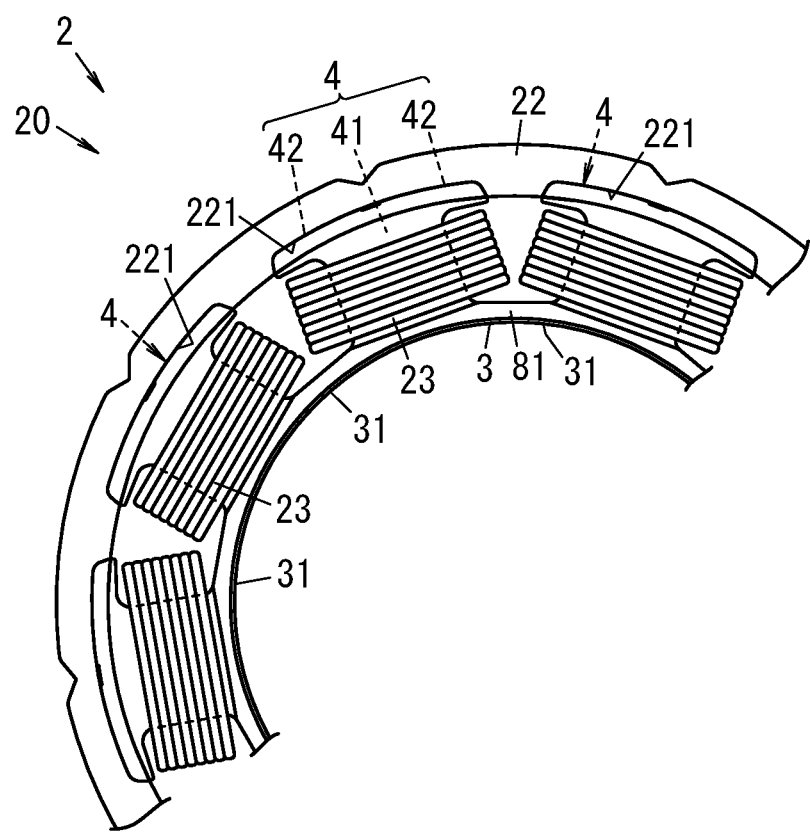
FIG. 8 is a plan view illustrating a principal part of a stator of the motor.

As shown in FIGS. 7 and 8, the inner cylindrical portion 3 includes a plurality of (e.g., nine in this embodiment) coupling portions 31, each of which is a portion that couples two teeth 4 together. Each of the coupling portions 31 is formed in the shape of an arc when viewed along the axis of the inner cylindrical portion 3.

Figure 9:
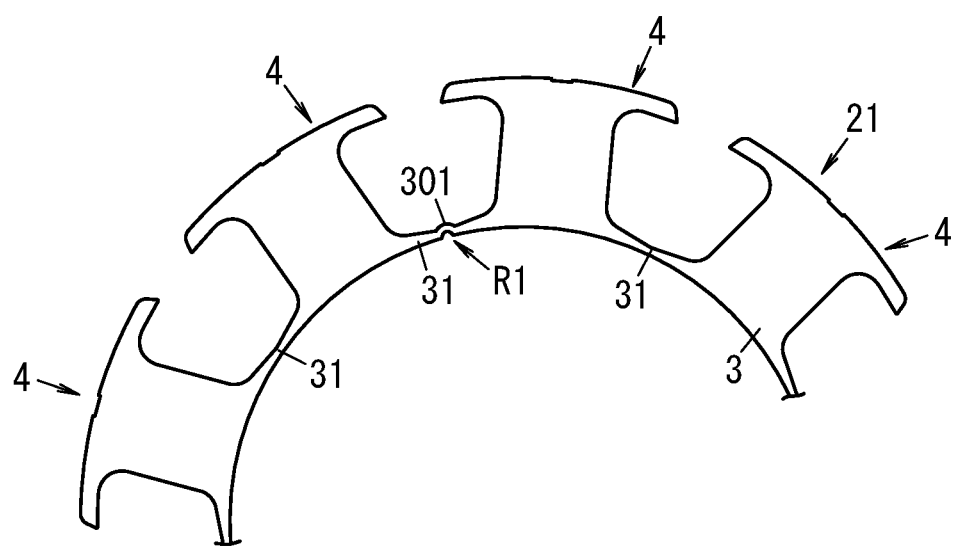
FIG. 9 is a plan view illustrating an alternative exemplary configuration for the central core of the motor.

Alternatively, the inner cylindrical portion 3 may include a high magnetic resistance portion R1 as shown in FIG. 9. The high magnetic resistance portion R1 has higher magnetic resistance than parts, surrounding the high magnetic resistance portion R1, of the inner cylindrical portion 3. In the example illustrated in FIG. 9, the high magnetic resistance portion R1 is provided for a single coupling portion 31. Providing the high magnetic resistance portion R1 may reduce the magnetic flux generated by the coil 23 which leaks to the coupling portion 31. This allows the motor 1 to have increased torque compared to a situation where the inner cylindrical portion 3 includes no high magnetic resistance portions R1. Optionally, the high magnetic resistance portions R1 may be provided at multiple points. For example, the high magnetic resistance portions R1 may be provided for all coupling portions 31. Alternatively, the high magnetic resistance portions R1 may also be provided at regular intervals along the circumference of the inner cylindrical portion 3.

In the example illustrated in FIG. 9, the high magnetic resistance portion R1 includes a bypass portion 301. When viewed along the axis of the inner cylindrical portion 3, the inner cylindrical portion 3 basically has the shape of a ring. The inner cylindrical portion 3 has a curved shape in which the bypass portion 301 of the inner cylindrical portion 3 protrudes radially with respect to the ring. In addition, the inner cylindrical portion 3 is continuous along its circumference.

Providing the inner cylindrical portion 3 with the bypass portion 301 extends the magnetic path and increases the magnetic resistance in the bypass portion 301, compared to a situation where no bypass portion 301 is provided.

Figure 10:
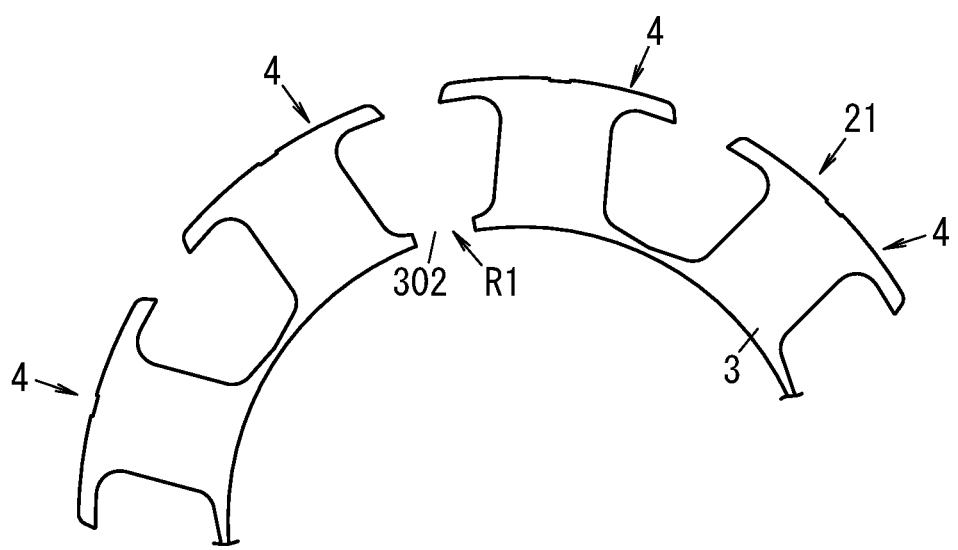
FIG. 10 is a plan view illustrating another alternative exemplary configuration for the central core of the motor.

In another example, the high magnetic resistance portion R1 includes a penetrating portion 302 as shown in FIG. 10.

In this example, the high magnetic resistance portion R1 has only one penetrating portion 302. The penetrating portion 302 penetrates through the inner cylindrical portion 3 along its axis. This allows the penetrating portion 302 to divide the inner cylindrical portion 3 into multiple parts along its circumference. For example, when a single penetrating portion 302 is provided as shown in FIG. 10, the inner cylindrical portion 3 is divided into two at the penetrating portion 302 as a boundary. That is to say, in FIG. 10, the inner cylindrical portion 3 is discontinuous along the circumference. The penetrating portion 302 may be formed by stacking a plurality of steel plates 210 (see FIG. 5) one on top of another and then partially cutting off the inner cylindrical portion 3. Alternatively, a hole corresponding to the penetrating portion 302 may be provided through each of the plurality of steel plates 210 before the plurality of steel plates 210 are stacked one on top of another.

Figure 11:
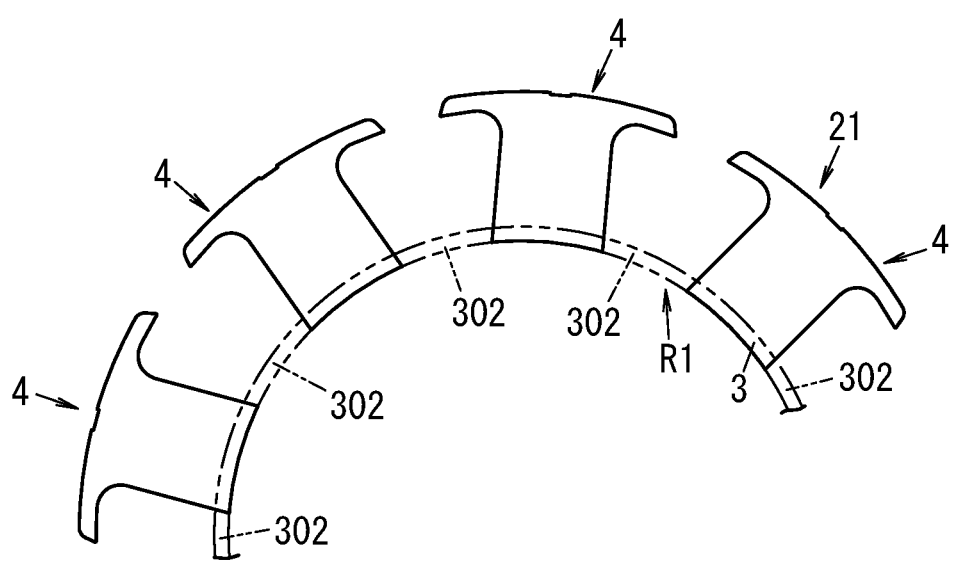
FIG. 11 is a plan view illustrating still another alternative exemplary configuration for the central core of the motor.

In still another example, the high magnetic resistance portion R1 has nine (only five of which are shown in FIG. 11) penetrating portions 302 as shown in FIG. 11. That is to say, the high magnetic resistance portion R1 has as many penetrating portions 302 as the teeth 4. Each of the nine penetrating portions 302 separates the plurality of teeth 4 from each other. In other words, the plurality of teeth 4 are not connected via the inner cylindrical portion 3 but are separate from each other. That is to say, in FIG. 11, the inner cylindrical portion 3 is discontinuous along its circumference. According to this implementation, the plurality of teeth 4 are held by the coil bobbin 8 to have their interval maintained. Note that in FIG. 11, the two-dot chains that indicate the inner cylindrical portion 3, including portions corresponding to the plurality of penetrating portions 302, are insubstantial ones.

Figure 12:
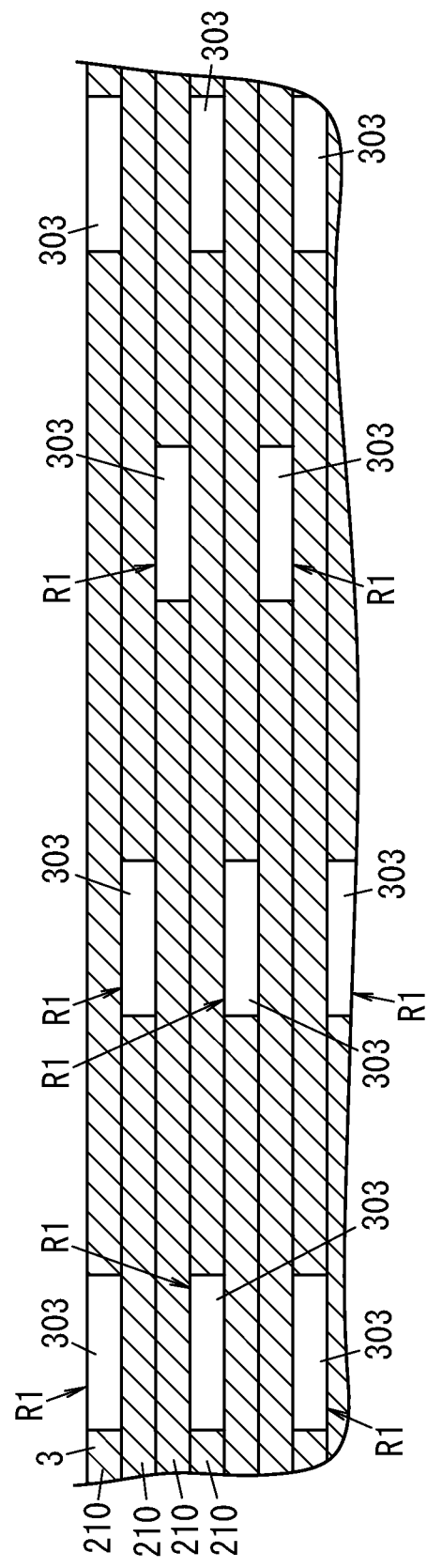
FIG. 12 is a cross-sectional view illustrating yet another alternative exemplary configuration for the central core of the motor.

Yet another example will be described with reference to FIG. 12. FIG. 12 illustrates a part, extended as a plan view, of a cross section of the inner cylindrical portion 3. The high magnetic resistance portion R1 is provided for each of two or more steel plates 210, out of the plurality of steel plates 210. In FIG. 12, the high magnetic resistance portion R1 is provided for every steel plate 210. In other words, the inner cylindrical portion 3 includes a plurality of high magnetic resistance portions R1.

Each high magnetic resistance portion R1 has a plurality of cavities 303. Each of the plurality of cavities 303 penetrates through its associated steel plate 210 along the axis. Each cavity 303 may be formed by, for example, cutting out the steel plate 210. The plurality of cavities 303 are provided for respective parts, corresponding to the coupling portions 31 of the inner cylindrical portion 3 (see FIGS. 7 and 8), of the steel plate 210. The plurality of cavities 303 are provided at regular intervals along the circumference of the steel plate 210.

The plurality of steel plates 210 are stacked one on top of another such that the respective high magnetic resistance portions R1 (cavities 303) of two or more adjacent steel plates 210 do not overlap with each other along the thickness of the steel plates 210. In this case, the nine coupling portions 31 will be hereinafter referred to as a "first coupling portion," a "second coupling portion," . . . , and a "ninth coupling portion," respectively, in the order in which the coupling portions 31 are arranged side by side along the circumference of the inner cylindrical portion 3. In addition, the plurality of steel plates 210 will be hereinafter referred to as a "first steel plate," a "second steel plate," . . . , and so on, respectively, in the order in which the steel plates 210 are arranged one on top of another along the thickness of the steel plates 210. For example, in the first steel plate, the cavities 303 are provided through its parts corresponding to the first, fourth, and seventh coupling portions, respectively. In the second steel plate, the cavities 303 are provided through its parts corresponding to the second, fifth, and eighth coupling portions, respectively. In the third steel plate, the cavities 303 are provided through its parts corresponding to the third, sixth, and ninth coupling portions, respectively. In the inner cylindrical portion 3, between one cavity 303 and another cavity 303, provided at such a position where the latter cavity 303 overlaps with the former cavity 303 along the thickness of the steel plates 210, arranged are respective non-cavity 303 portions of one or more (e.g., two in the example shown in FIG. 12) steel plates 210.

The cavities 303 may be provided through each steel plate 210, for example, before the plurality of steel plates 210 are stacked one on top of another. The plurality of steel plate 210 are formed to have the same shape when viewed in the thickness direction and are stacked one on top of another such that two adjacent ones of the steel plates 210 have mutually different orientations (angles). More specifically, the second steel plate is stacked on the first steel plate to have an orientation that forms an angle of rotation of 40 degrees with respect to the first steel plate. The third steel plate is stacked on the second steel plate to have an orientation that forms an angle of rotation of 40 degrees with respect to the second steel plate. Likewise, each of the fourth steel plate and the other steel plates is stacked to have an orientation that forms an angle of rotation of 40 degrees (which is a predetermined angle) with respect to its adjacent steel plate. Optionally, some of the plurality of steel plates 210 may have a different thickness from others of the plurality of steel plates 210.

Figure 13:
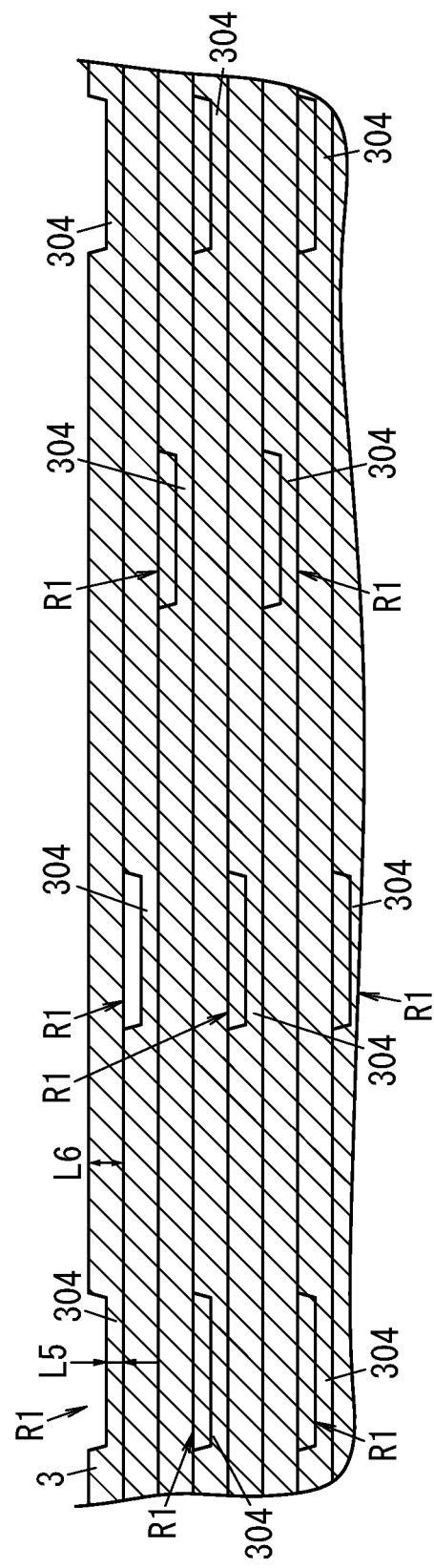
FIG. 13 is a cross-sectional view illustrating yet another alternative exemplary configuration for the central core of the motor.

Still another example will be described with reference to FIG. 13. FIG. 13 illustrates a part, extended as a plan view, of a cross section of the inner cylindrical portion 3. As shown in FIG. 13, the high magnetic resistance portions R1 of each of the steel plates 210 may have thinned portions 304 instead of the cavities 303. Each of the thinned portions 304 has a shorter dimension as measured along the axis of the inner cylindrical portion 3 than parts, surrounding the thinned portion 304, of the inner cylindrical portion 3. That is to say, the thickness L5 of each thinned portion 304 of a steel plate 210 is smaller than the thickness L6 of parts, surrounding the thinned portion 304, of the steel plate 210. The thinned portion 304 is formed by subjecting a part of each steel plate 210 to pressing. This allows the steel plate 210 to have higher strength, compared to a situation where the thinned portion 304 is formed by removing a part of the steel plate 210.

Although some examples of the high magnetic resistance portion R1 have been described one by one, two or more of these examples may be adopted in combination as appropriate.

(2-3) Coils and Coil Bobbin

As shown in FIG. 1, nine coils 23 are provided one to one for the nine teeth 4. The nine coils 23 are electrically connected together. The winding serving as each coil 23 may be an enamel wire, for example. This winding includes a linear conductor and an insulating coating that covers the conductor.

The motor 1 further includes a coil bobbin 8. The coil bobbin 8 may be made of a synthetic resin, for example. The coil bobbin 8 has electrical insulation properties. The coil bobbin 8 at least partially covers at least one (e.g., all, in this embodiment) of the plurality of teeth 4.

As shown in FIG. 6, the coil bobbin 8 includes two members 81. The two members 81 have the same shape. The two members 81 are arranged along the axis of the inner cylindrical portion 3. The two members 81 are provided separately from each other. Each member 81 is formed in such a shape that allows the plurality of teeth 4 to be fitted thereto along the axis of the inner cylindrical portion 3. Specifically, one of the two members 81 is attached to the central core 21 to cover the plurality of teeth 4 from a first end along the axis of the inner cylindrical portion 3. The other member 81 covers the plurality of teeth 4 from a second end along the axis of the inner cylindrical portion 3. Each member 81 includes: a cylindrical body 811 to overlap with the inner cylindrical portion 3; and a plurality of (e.g., nine in the example illustrated in FIG. 6) tooth covering portions 812 to cover the plurality of teeth 4. The cylindrical body 811 is formed in the shape of a circular cylinder, which is concentric with the inner cylindrical portion 3. Each tooth covering portion 812 protrudes outward along the radius of the cylindrical body 811 from the cylindrical body 811. A tip, located opposite from the tip closer to the inner cylindrical portion 3, of each tooth 4 is not covered with the coil bobbin 8 but is in contact with the outer cylindrical portion 22.

As shown in FIGS. 5 and 8, in a state where the two members 81 are attached to the central core 21 to cover the plurality of teeth at least partially, each coil 23 is wound around an associated body portion 41 via the two members 81 (of the coil bobbin 8). In this case, the coil 23 is wound around the body portion 41 so as to pass through a slot (cavity) between the body portion 41 and each of two body portions 41 adjacent to the former body portion 41.

The two members 81 are out of contact with each other along the axis of the inner cylindrical portion 3. Thus, in a region around the middle of the thickness of the central core 21, each tooth 4 is exposed in a direction perpendicular to the thickness of the central core 21. If the number of the steel plates 210 that form the central core 21 is changed to modify the design of the motor 1, for example, the thickness of the central core 21 changes. Then, as the thickness of the central core 21 changes, the gap distance between the two members 81 also changes.

(2-4) Outer Cylindrical Portion

As shown in FIG. 5, the outer cylindrical portion 22 includes a plurality of steel plates 220. In other words, the outer cylindrical portion 22 is formed by stacking the plurality of steel plates 220 one on top of another in the thickness direction. Each steel plate 220 is made of a magnetic material. Each steel plate 220 may be a silicon steel plate, for example.

As shown in FIGS. 1 and 8, the outer cylindrical portion 22 has a circular cylindrical shape. The outer cylindrical portion 22 is mounted on, and surrounds, the plurality of teeth 4.

The outer cylindrical portion 22 includes a plurality of (e.g., nine) fitting portions 221. In other words, the outer cylindrical portion 22 includes as many fitting portions 221 as the teeth 4. Each of the plurality of fitting portions 221 is a recess provided on the inner peripheral surface of the outer cylindrical portion 22. The plurality of fitting portions 221 correspond one to one to the plurality of teeth 4. Each of the plurality of fitting portions 221 and one tooth 4, corresponding to the fitting portion 221, out of the plurality of teeth 4 are fitted into each other by causing at least one of the fitting portion 221 or the tooth 4 to move along the radius of the inner cylindrical portion 3. This allows the outer cylindrical portion 22 to be mounted onto the plurality of teeth 4.

To each fitting portion 221, a portion, including the two tip pieces 42, of an associated tooth 4 is fitted. Thus, the length, measured along the circumference of the outer cylindrical portion 22, of each fitting portion 221 is equal to the length as measured from the protruding tip of one of the two tip pieces 42 protruding from the body portion 41 through the protruding tip of the other tip piece 42. Note that as used herein, if some value is "equal to" another, these two values do not have to be exactly equal to each other but may also be different from each other within a tolerance range. The tolerance range may be defined by an error of within 3%, within 5%, or within 10%, for example.

With the coil bobbin 8 attached onto the central core 21 and the coils 23 wound around the coil bobbin 8, the outer cylindrical portion 22 may be mounted onto the plurality of teeth 4 by shrink-fitting, for example. Specifically, with the outer cylindrical portion 22 heated and expanded radially, the central core 21 is put inside the outer cylindrical portion 22. This makes the inner surface of the outer cylindrical portion 22 face the respective tips of the plurality of teeth 4 along the radius of the inner cylindrical portion 3 with a narrow gap left between the inner surface of the outer cylindrical portion 22 and the plurality of teeth 4. Thereafter, as the temperature of the outer cylindrical portion 22 falls to cause the outer cylindrical portion 22 to shrink, the inner surface of the outer cylindrical portion 22 comes into contact with the respective tips of the plurality of teeth 4. That is to say, when the plurality of fitting portions 221 move inward along the radius of the outer cylindrical portion 22 as the outer cylindrical portion 22 shrinks, the plurality of fitting portions 221 and the plurality of teeth 4 are fitted into each other. The outer cylindrical portion 22 applies, to the plurality of teeth 4, contact pressure produced inward along the radius of the outer cylindrical portion 22.

(2-6) Rotor

Next, the configuration of the rotor 5 will be described in detail. As shown in FIG. 5, the rotor core 6 of the rotor 5 includes a plurality of steel plates 600. In other words, the rotor core 6 is formed by stacking a plurality of steel plates 600 one on top of another in the thickness direction. Each steel plate 600 is made of a magnetic material. Each steel plate 600 may be a silicon steel plate, for example.

The rotor core 6 is formed in the shape of a circular cylinder, which is concentric with the inner cylindrical portion 3 of the stator core 20. Along the axis of the rotor core 6, both ends of the rotor core 6 are aligned with both ends of the stator core 20. That is to say, a first end (e.g., the upper end on the paper on which FIG. 5 is drawn) along the axis of the rotor core 6 and a first end (e.g., the upper end on the paper on which FIG. 5 is drawn) along the axis of the inner cylindrical portion 3 of the stator core 20 are aligned with a direction perpendicular to these axes. In the same way, a second end (e.g., the lower end on the paper on which FIG. 5 is drawn) along the axis of the rotor core 6 and a second end (e.g., the lower end on the paper on which FIG. 5 is drawn) along the axis of the inner cylindrical portion 3 of the stator core 20 are aligned with a direction perpendicular to these axes. The rotor core 6 is as thick as the stator core 20. In this case, the first end of the rotor core 6 and the first end of the stator core 20 do not have to be exactly aligned with each other but may be misaligned with each other within a tolerance range. Likewise, the second end of the rotor core 6 and the second end of the stator core 20 do not have to be exactly aligned with each other but may be misaligned with each other within a tolerance range. The tolerance range may be defined by an error of within 3%, within 5%, or within 10%, for example, of the thickness of the rotor core 6.

Figure 3:
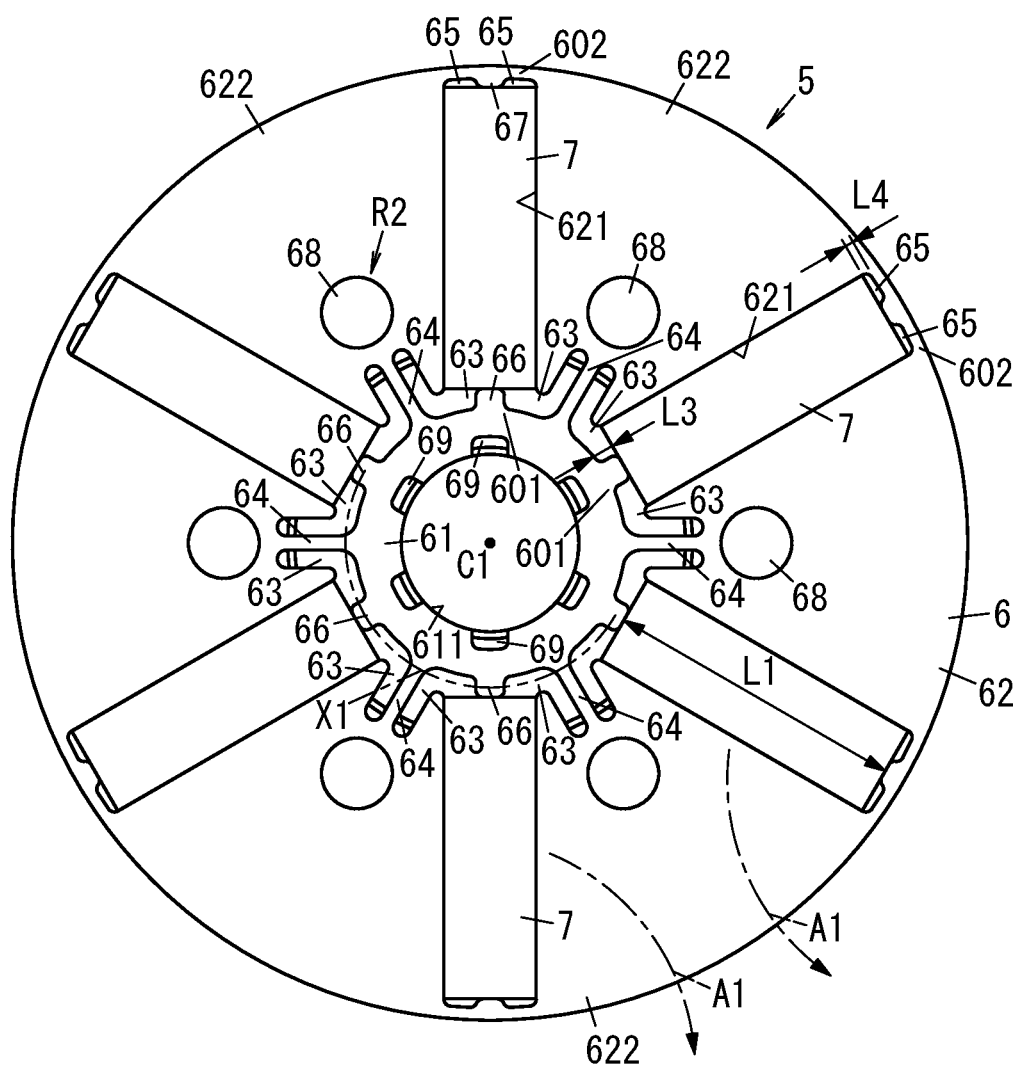
FIG. 3 is a plan view of a rotor included in the motor.

Inside the rotor core 6, the output shaft 51 is held. As shown in FIG. 3, the rotor core 6 includes: a shaft holder 61 having a shaft hole 611, through which the output shaft 51 is passed; and a rotor body 62 surrounding the shaft holder 61. The shaft holder 61 has a circular cylindrical shape. The space inside the shaft holder 61 is the shaft hole 611. The rotor body 62 has the shape of a circular cylinder, which is concentric with the shaft holder 61. The rotor core 6 includes, between the shaft holder 61 and the rotor body 62, a plurality of (e.g., twelve in the example illustrated in FIG. 3) penetrating portions 63 and a plurality of (e.g., six in the example illustrated in FIG. 3) bridge portions 64 that couple the shaft holder 61 to the rotor body 62.

The rotor body 62 includes a plurality of (e.g., six in the example illustrated in FIG. 3) magnet housings 621. The plurality of magnet housings 621 house the plurality of permanent magnets 7 such that the plurality of permanent magnets 7 are arranged as spokes (i.e., radially) around the center C1 of the rotor core 6. Each of the plurality of magnet housings 621 is a through hole that penetrates through the rotor body 62 along its axis. Each of the permanent magnets 7 is held in an associated one of the magnet housings 621 by being inserted into the associated magnet housing 621 with an adhesive applied. Alternatively, each of the plurality of permanent magnets 7 may also be held in its associated magnet housing 621 with magnetic suction force between the rotor core 6 and the permanent magnet 7, instead of using the adhesive.

The plurality of magnet housings 621 are provided at regular intervals along the circumference of the rotor core 6. This allows the plurality of permanent magnets 7 to be arranged at regular intervals along the circumference of the rotor core 6. In addition, the longitudinal axis of each of the plurality of permanent magnets 7 is aligned with the radius of the rotor core 6.

Each permanent magnet 7 may be a neodymium magnet, for example. The two magnetic poles of each permanent magnet 7 are arranged along the circumference of the rotor core 6. Two permanent magnets 7, which are adjacent to each other along the circumference of the rotor core 6, are arranged with their magnetic poles with the same polarity facing each other. Part of the magnetic flux generated between two permanent magnets 7 which are adjacent to each other along the circumference of the rotor core 6 is directed from a region 622, located between the two permanent magnets 7, of the rotor body 62 toward the stator 2 (see FIG. 1) (as indicated by the arrow A1). That is to say, a magnetic flux aligned with the radius of the rotor core 6 is produced between the region 622 and the stator 2.

The rotor core 6 has a high magnetic resistance portion R2. The high magnetic resistance portion R2 has higher magnetic resistance than parts, surrounding the high magnetic resistance portion R2, of the rotor core 6. The high magnetic resistance portion R2 is provided on the magnetic path of the magnetic flux generated by the plurality of permanent magnets 7. The magnetic path of the magnetic flux generated by the plurality of permanent magnets 7 includes: a region facing any of the two magnetic poles of a particular one of the permanent magnets 7; and a region located adjacent to the particular permanent magnet 7 and on a curve connecting the two magnetic poles of the particular permanent magnet 7. Providing the high magnetic resistance portion R2 may reduce the magnetic flux generated by, and leaking from, the permanent magnets 7. In other words, the magnetic flux directed from the region 622 located between two permanent magnets 7 adjacent to each other along the circumference of the rotor core 6 toward the stator 2 (see FIG. 1) may be increased. This allows the motor 1 to have an increased torque.

The high magnetic resistance portion R2 may include, for example, the plurality of penetrating portions 63 described above. Each of the plurality of penetrating portions 63 penetrates through the rotor core 6 along its axis. In addition, the high magnetic resistance portion R2 further includes a plurality of (e.g., twelve in the example illustrated in FIG. 3) penetrating portions 65, which are provided separately from the plurality of penetrating portions 63. Each of the penetrating portions 65 penetrates through the rotor core 6 along its axis. Each of the plurality of penetrating portions 63 and each of the plurality of penetrating portions 65 communicate with the magnet housings 621.

In this embodiment, the rotor core 6 includes first parts 601 and second parts 602. A plurality of (e.g., six) first parts 601 and a plurality of (e.g., six) second parts 602 are provided one to one for the plurality of permanent magnets 7. The following description will be focused on one permanent magnet 7 and the first part 601 and second part 602 provided for the permanent magnet 7.

The first part 601 and the second part 602 are adjacent to the permanent magnet 7 along the radius of the rotor core 6. The first part 601 includes a part of the shaft holder 61. The first part 601 is one end portion, located closer to the center C1 of the rotor core 6, out of two end portions (along the radius of the rotor core 6) of the permanent magnet 7. More specifically, the first part 601 is a part located between the permanent magnet 7 and the shaft hole 611.

The first part 601 is provided with at least respective parts of the two penetrating portions 63. The two penetrating portions 63 are arranged side by side along the circumference of the rotor core 6. Each of the two penetrating portions 63 includes a part extending along the circumference of the rotor core 6 and a part extending along the radius of the rotor core 6. In addition, a projection 66 protruding from the shaft holder 61 is further provided between the two penetrating portions 63. That is to say, the rotor core 6 includes the projection 66. The projection 66 is in contact with the permanent magnet 7 along the radius of the rotor core 6.

The second part 602 includes a part of the rotor body 62. The second part 602 is one end portion, located closer to the outer periphery of the rotor core 6, out of the two end portions (along the radius of the rotor core 6) of the permanent magnet 7. More specifically, the second part 602 is a part located between the permanent magnet 7 and the outer edge of the rotor core 6.

The second part 602 is provided with two penetrating portions 65. The two penetrating portions 65 are arranged side by side along the circumference of the rotor core 6. The longitudinal axis of each of the two penetrating portions 65 extends along the circumference of the rotor core 6. In addition, a projection 67 in contact with the permanent magnet 7 along the radius of the rotor core 6 is further provided between the two penetrating portions 65. That is to say, the rotor core 6 includes the projection 67. Interposing the permanent magnet 7 between the projections 66, 67 regulates the movement of the permanent magnet 7 along the radius of the rotor core 6.

That is to say, at least parts (namely, the penetrating portions 63, 65) of the high magnetic resistance portion R2 are provided for at least one of the first part 601 or the second part 602.

The length L3 in the first part 601 of the high magnetic resistance portion R2 (i.e., the length measured along the radius of the rotor core 6) is different from the length L4 in the second part 602 of the high magnetic resistance portion R2 (i.e., the length measured along the radius of the rotor core 6). Specifically, the length L3 is greater than the length L4. The length L3 in the first part 601 is the length, measured along the radius of the rotor core 6, of the penetrating portions 63. The length L4 in the second part 602 is the length, measured along the radius of the rotor core 6, of the penetrating portions 65.

A bridge portion 64 is provided between a penetrating portion 63 provided adjacent to an arbitrary one of the plurality of permanent magnets 7 and another penetrating portion 63 provided adjacent to another permanent magnet 7 that is adjacent to the arbitrary permanent magnet 7. Thus, a plurality of (e.g., six) bridge portions 64 are provided at regular intervals along the circumference of the rotor core 6. In addition, a penetrating portion 68 is also provided for a region, facing the bridge portion 64 along the radius of the rotor core 6, of the rotor body 62. The penetrating portion 68 is included in the high magnetic resistance portion R2. The penetrating portion 68 penetrates through the rotor core 6 along its axis. When viewed along the axis of the rotor core 6, the penetrating portion 63 has a circular shape. A plurality of (e.g., six in the example illustrated in FIG. 3) penetrating portions 68 are provided one to one for the plurality of bridge portions 64.

The rotor core 6 has a plurality of (e.g., six in the example illustrated in FIG. 3) voids 69 (through holes). Each of the plurality of voids 69 penetrates through the rotor core 6 along its axis. The plurality of voids 69 are provided for, for example, a region different from the magnetic path of the magnetic flux generated by the plurality of permanent magnets 7. The plurality of voids 69 are provided along the inner edge of the shaft holder 61. The plurality of voids 69 are provided at regular intervals along the circumference of the rotor core 6. The plurality of voids 69 communicate with the shaft hole 611. Providing the plurality of voids 69 allows the weight of the rotor core 6 to be reduced.

Optionally, the respective voids 69 may be included in the high magnetic resistance portion R2. That is to say, the respective voids 69 may be provided for the magnetic path of the magnetic flux generated by the plurality of permanent magnets 7.

Figure 14:
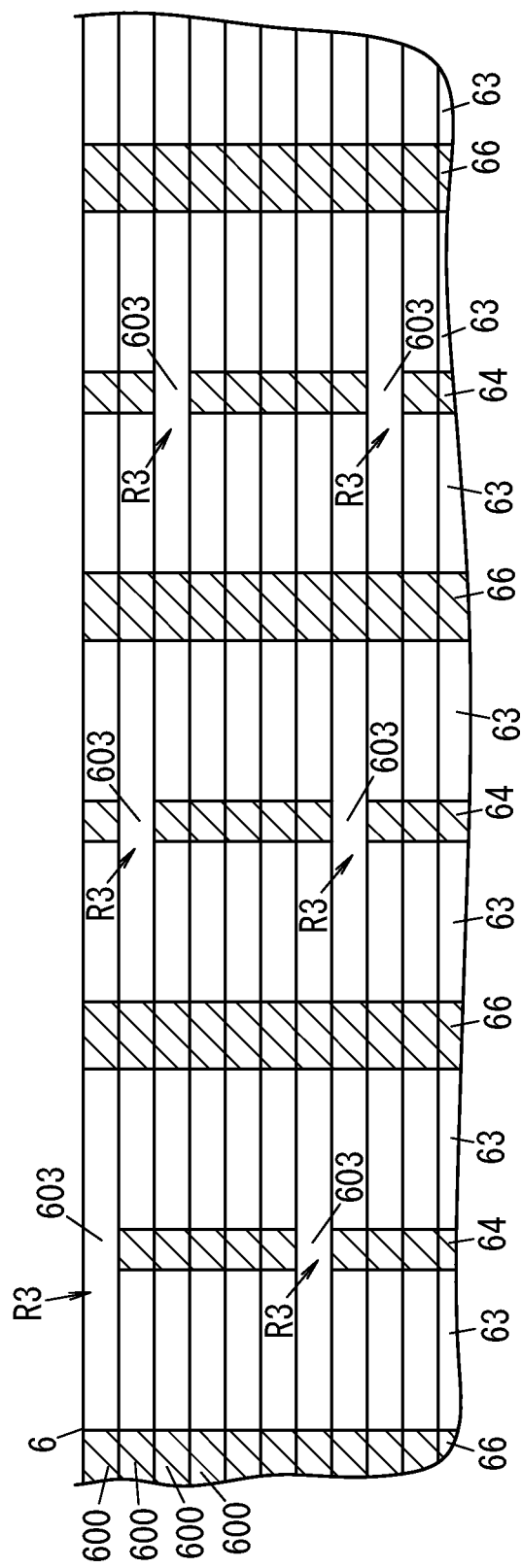
FIG. 14 is a cross-sectional view of a rotor core of the motor.

FIG. 14 illustrates a part, extended as a plan view, of a cross section indicated by the curve X1 in FIG. 3. The high magnetic resistance portion R3 is provided for each of a plurality of steel plates 600 of the rotor core 6. In other words, the rotor core 6 includes a plurality of high magnetic resistance portions R3.

Each high magnetic resistance portion R3 has a plurality of cavities 603. Each of the plurality of cavities 603 penetrates through an associated steel plate 600 along its axis. The plurality of cavities 603 are provided for regions, corresponding to the bridge portions 64, of the steel plates 600. That is to say, each of the plurality of cavities 603 is provided to cut off a region corresponding to the bridge portion 64 into two parts. In this embodiment, one cavity 603 is provided for each steel plate 600. Note that illustration of the plurality of cavities 603 is omitted from all drawings but FIG. 14.

The plurality of steel plates 600 are stacked one on top of another such that the respective high magnetic resistance portions R3 (cavities 603) of adjacent steel plates 600 do not overlap with each other along the thickness of the steel plates 600. In this case, the six bridge portions 64 will be hereinafter referred to as a "first bridge portion," a "second bridge portion," . . . , and a "sixth bridge portion," respectively, in the order in which the bridge portions 64 are arranged side by side in the circumferential direction. In addition, the plurality of steel plates 600 will be hereinafter referred to as a "first steel plate," a "second steel plate," . . . , and so on, respectively, in the order in which the steel plates 600 are arranged one on top of another along the thickness of the steel plates 600. For example, in the first, seventh, thirteenth, and other steel plates, the cavity 603 is provided for a region corresponding to the first bridge portion. In the second, eighth, fourteenth, and other steel plates, the cavity 603 is provided for a region corresponding to the second bridge portion. In the third, ninth, fifteenth, and other steel plates, the cavity 603 is provided for a region corresponding to the third bridge portion. In the rotor core 6, parts, other than the cavities 603, of one or more (e.g., five in the example illustrated in FIG. 14) steel plates 600 are arranged in a portion thereof located between one cavity 603 and another cavity 603 provided to overlap with the former cavity 603 along the thickness of the steel plates 600.

The cavities 603 may be provided through the respective steel plates 600, for example, before the plurality of steel plates 600 are stacked one on top of another. The plurality of steel plates 600 are formed to have the same shape when viewed in the thickness direction and are stacked one on top of another such that two adjacent ones of the steel plates 600 have mutually different orientations (angles). More specifically, the second steel plate is stacked on the first steel plate to have an orientation that forms an angle of rotation of 60 degrees with respect to the first steel plate. The third steel plate is stacked on the second steel plate to have an orientation that forms an angle of rotation of 60 degrees with respect to the second steel plate. Likewise, each of the fourth steel plate and the other steel plates is stacked to have an orientation that forms an angle of rotation of 60 degrees (which is a predetermined angle) with respect to its adjacent steel plate. Optionally, a plurality of cavities 603 may be provided for each steel plate 600. For example, the plurality of cavities 603 may be provided at regular intervals along the circumference of the steel plate 600. Optionally, some of the plurality of steel plates 600 may have a different thickness from others of the plurality of steel plates 600.

Figure 15:
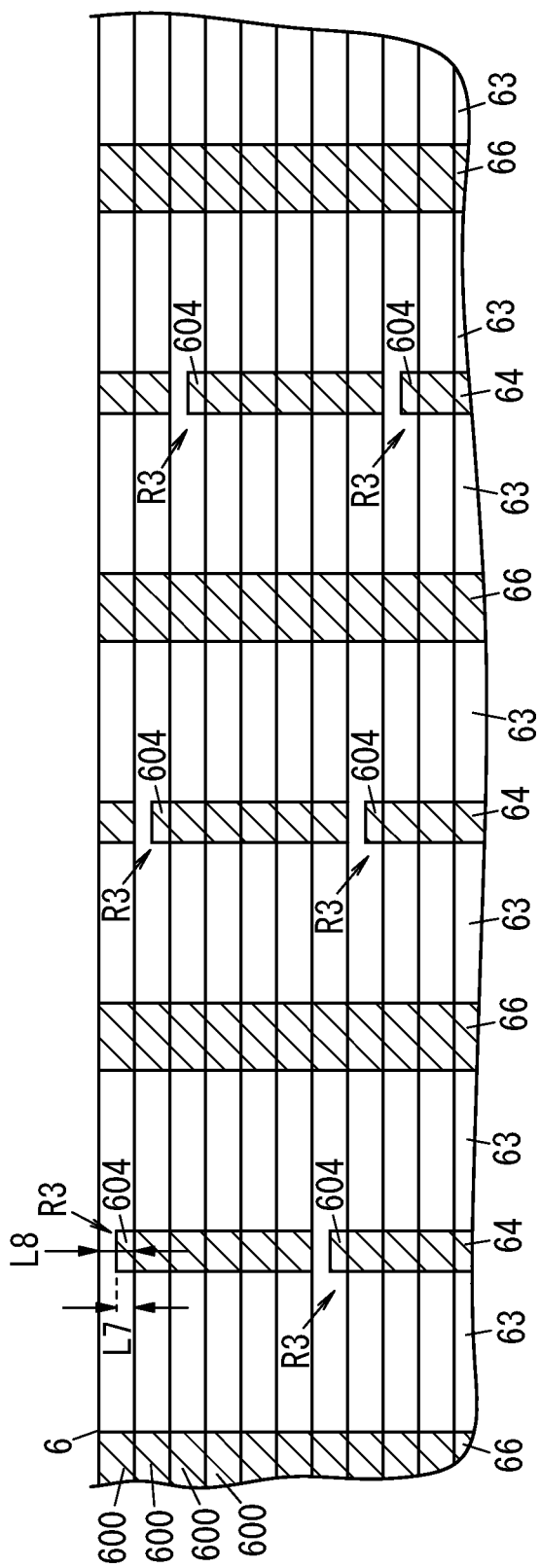
FIG. 15 is a cross-sectional view illustrating an alternative exemplary configuration for the rotor core of the motor.

In still another example, the high magnetic resistance portion R3 of each steel plate 600 may have a thinned portion 604 instead of the cavity 603 as shown in FIG. 15. Each of the thinned portions 604 has a shorter dimension as measured along the axis of the rotor core 6 than parts, surrounding the thinned portion 604, of the rotor core 6 (such as a part corresponding to the shaft holder 61). That is to say, the thickness L7 of each thinned portion 604 of a steel plate 600 is smaller than the thickness L8 of parts, surrounding the thinned portion 604, of the steel plate 600. The thinned portion 604 is formed by subjecting a part of each steel plate 600 to pressing. This allows the steel plate 600 to have higher mechanical strength, compared to a situation where the thinned portion 604 is formed by removing a part of the steel plate 600.

Note that the cavities 603 and thinned portions 604 do not have to be provided for regions, corresponding to the bridge portions 64, of the rotor core 6. Alternatively, the cavities 603 and the thinned portions 604 may be provided, for example, for a region, corresponding to the first part 601, of the rotor core 6 and/or a region, corresponding to the second part 602, of the rotor core 6.

(2-6) Base and Bearing

As shown in FIGS. 1 and 5, the motor 1 further includes a base 9 and two bearings 52. A bottomed cylindrical cover is attached to the base 9. The stator 2 and the rotor 5 are housed in the space surrounded with the base 9 and the cover. One of the two bearings 52 is fixed to the cover and the other bearing 52 is fixed to the base 9. The two bearings 52 hold the output shaft 51 of the rotor 5 rotatably.

(2-7) Advantages

In a manufacturing process of the motor 1, with the central core 21 and outer cylindrical portion 22 of the stator 2 separated from each other, the coils 23 are wound around the body portions 41 of the plurality of teeth 4 of the central core 21 via the coil bobbin 8. Thereafter, the outer cylindrical portion 22 is mounted onto the plurality of teeth 4.

The coils 23 are wound around the teeth 4 using a tool arranged beside the tip part of the respective teeth 4, for example. The plurality of teeth 4 protrude radially outward from the inner cylindrical portion 3. This allows the space left at the tip of each tooth 4 to be broadened, compared to a situation where the plurality of teeth 4 protrude inward. This facilitates winding the coils 23 around the respective teeth 4, and in some cases, allows the space factor of the coils 23 to be increased.

In addition, each tooth 4 includes two tip pieces 42 that reduce the chances of the coil 23 coming off the body portion 41, thus allowing the coil 23 to be wound more easily around each tooth 4. Furthermore, the stress applied to each tooth 4 may be distributed in the two tip pieces 42, thus reducing the chances of the tooth 4 being deformed. Furthermore, each tip piece 42 includes the curvilinear surface 421, which is in contact with the outer cylindrical portion 22. This allows, when the outer cylindrical portion 22 is mounted onto the plurality of teeth 4, the stress applied from the outer cylindrical portion 22 to the respective teeth 4 to be distributed more easily along the curvilinear surface 421, compared to a situation where the surface of the tip pieces 42 is formed as a flat surface.

Furthermore, each tip piece 42 has the curved portion 422 in a part connected to its associated body portion 41. Thus, part of the magnetic flux passing through each tooth 4 passes through the body portion 41 and the curved portion 422 and then passes through the curved portion 422 and body portion 41 of an adjacent tooth 4 (as indicated by the arrow A2 shown in FIG. 7). As can be seen, part of the magnetic flux is extracted out of the tooth 4 by passing through such a magnetic path that is curved along the curved portion 422 with respect to the radius of the inner cylindrical portion 3. This shortens the magnetic path compared to a situation where the magnetic flux is extracted out of the tooth 4 by passing through a magnetic path aligned with the radius of the inner cylindrical portion 3. That is to say, such a magnetic path comes to have reduced magnetic resistance.

Furthermore, the plurality of teeth 4 are connected together at one end thereof via the inner cylindrical portion 3 and are in contact with the outer cylindrical portion 22 at the other end thereof. In other words, the inner cylindrical portion 3 is provided at one end of the plurality of teeth 4 and the outer cylindrical portion 22 is provided at the other end of the plurality of teeth 4. This contributes to increasing the mechanical strength of the stator core 20, compared to a situation where only either the inner cylindrical portion 3 or the outer cylindrical portion 22 is provided. In addition, this may increase the robustness of the dimensional tolerance of the stator core 20 and contributes to reducing cogging of the motor 1.

Furthermore, the plurality of permanent magnets 7 are arranged as spokes around the center C1 of the rotor core 6, thus facilitating shortening the diameter of the rotor 5.

(Variations of Exemplary Embodiment)

Next, variations of the exemplary embodiment described above will be enumerated one after another. Note that the variations to be described below may be adopted in combination as appropriate.

The configuration of the stator 2 may be changed arbitrarily. For example, the plurality of teeth 4 may be separated from the inner cylindrical portion 3. Additionally, the plurality of teeth 4 may protrude inward from the outer cylindrical portion 22 along the radius of the outer cylindrical portion 22. Optionally, the plurality of teeth 4 may include no tip pieces 42. Furthermore, the inner cylindrical portion 3 may have no high magnetic resistance portions R1.

The rotor core 6 does not have to include the high magnetic resistance portions R2, R3.

When viewed along its axis, the rotor core 6 does not have to have a perfectly circular shape. Alternatively, the rotor core 6 may also have a generally circular or elliptical shape with some projections or recesses provided along its circumference.

Into each of the penetrating portions 302 of the stator core 20 and the penetrating portions 63, 65, 68 of the rotor core 6, a spacer made of a non-magnetic material may be inserted. That is to say, the high magnetic resistance portion R2 may include not only the penetrating portions 63, 65, 68 but also spacers.

The number of the permanent magnets 7 provided does not have to be six but may also be two or more.

The motor 1 does not have to be provided for the electric tool 10. Alternatively, the motor 1 may also be provided for an electric bicycle or an electric assist bicycle, for example.

Optionally, the motor 1 may further include a weight adjuster attached to the rotor 5. The weight adjuster may be configured as, for example, a cylindrical weight and may be attached to the output shaft 51 of the rotor 5. The weight balance of the rotor 5 may be adjusted by partially cutting off the weight adjuster and thereby changing the weight and center of gravity of the weight adjuster. This allows compensating for a shift caused, by providing the penetrating portions 63, 65, 68 and the cavities 603 for the rotor core 6, in the weight balance of the rotor 5. Still alternatively, the weight balance of the rotor 5 may also be adjusted by partially cutting off the rotor core 6 itself. Yet alternatively, the weight balance of the rotor 5 may also be adjusted by adjusting the positions and amount of the adhesive applied to the rotor 5.

Optionally, in the plurality of steel plates 210 (or 600), the arrangement of the cavities 303 (or 603) may be changed. To ensure sufficient mechanical strength for the plurality of steel plates 210 (or 600), it is recommended that two or more cavities 303 (or 603) not be adjacent to each other along the thickness of the plurality of steel plates 210 (or 600).

Optionally, the cavities 303 (or 603) may also be provided periodically along the thickness of the plurality of steel plates 210 (or 600). For example, between an arbitrary cavity 303 (or 603) and another cavity 303 (or 603) overlapping with the former cavity 303 (or 603) along the thickness of the plurality of steel plates 210 (or 600), a certain number of steel plates 210 (or 600) may be arranged. Alternatively, the distance between an arbitrary cavity 303 (or 603) and another cavity 303 (or 603) overlapping with the former cavity 303 (or 603) along the thickness of the plurality of steel plates 210 (or 600) may also be a constant distance.

Furthermore, the arrangement of the thinned portions 304 (or 604) in the plurality of steel plates 210 (or 600) may also be changed in the same way as the arrangement of the cavities 303 (or 603). Optionally, the plurality of steel plates 210 (or 600) may be provided with both the cavities 303 (or 603) and the thinned portions 304 (or 604).

Alternatively, the cavities 303 and/or the thinned portions 304 may be provided for only some of the plurality of steel plates 210. Likewise, the cavities 303 and/or the thinned portions 304 may be provided for only some of the plurality of steel plates 600.

Furthermore, each of the plurality of steel plates 210 and the plurality of steel plates 600 is suitably a single member, of which the respective parts are connected together. This may reduce the number of parts of the motor 1, compared to a situation where each steel plate 210 (or 600) is made up of a plurality of members.

Optionally, the voids 69 may also be provided for parts other than the shaft holder 61. Alternatively, each void 69 may also be a recess depressed along the axis of the rotor core 6.

Optionally, each of the plurality of fitting portions 221 of the outer cylindrical portion 22 may also be a projection. In that case, each of the plurality of teeth 4 may have a recess to which an associated fitting portion 221 is fitted.

(Recapitulation)

The embodiment and its variations described above may be specific implementations of the following aspects of the present disclosure.

An electric tool 10 according to a first aspect includes a motor 1. The motor 1 includes a stator core 20 and a rotor 5. The rotor 5 rotates with respect to the stator core 20. The rotor 5 includes: a rotor core 6 having a circular cylindrical shape; a plurality of permanent magnets 7; and an output shaft 51. The output shaft 51 is held inside the rotor core 6. The plurality of permanent magnets 7 are arranged as spokes around a center C1 of the rotor core 6.

According to this configuration, arranging the plurality of permanent magnets 7 as spokes around the center C1 of the rotor core 6 facilitates shortening the diameter of the rotor 5. Particularly when the number of the permanent magnets 7 provided is relatively large, this facilitates, compared to a situation where the plurality of permanent magnets 7 are arranged to form a polygonal pattern, shortening the diameter of the rotor 5 while keeping the length L1 measured along the longitudinal axis of each permanent magnet 7 long enough.

In an electric tool 10 according to a second aspect, which may be implemented in conjunction with the first aspect, the rotor 5 includes six or more permanent magnets 7 as the plurality of permanent magnets 7.

This configuration allows the motor 1 to have an increased torque, compared to a situation where the number of the permanent magnets 7 provided is less than six.

In an electric tool 10 according to a third aspect, which may be implemented in conjunction with the first or second aspect, the rotor core 6 includes a high magnetic resistance portion R2, R3. The high magnetic resistance portion R2, R3 is provided on a magnetic path of a magnetic flux generated by the plurality of permanent magnets 7. The high magnetic resistance portion R2, R3 has higher magnetic resistance than a portion, surrounding the high magnetic resistance portion R2, R3, of the rotor core 6.

This configuration may reduce the magnetic flux leaking from the rotor core 6.

In an electric tool 10 according to a fourth aspect, which may be implemented in conjunction with the third aspect, in at least one of the plurality of permanent magnets 7, at least part of the high magnetic resistance portion R2, R3 is provided for at least one of a first part 601 or a second part 602. The first part 601 and the second part 602 are located on both sides of the at least one permanent magnet along a radius of the rotor core 6.

This configuration may reduce the magnetic flux leaking from at least one of the first part 601 or the second part 602.

In an electric tool 10 according to a fifth aspect, which may be implemented in conjunction with the fourth aspect, the high magnetic resistance portion R2 (or R3) is provided for each of the first part 601 and the second part 602. A length L3, measured along the radius, of the high magnetic resistance portion R2 provided for the first part 601 is different from a length L4, measured along the radius, of the high magnetic resistance portion R2 provided for the second part 602.

This configuration contributes to increasing the magnetic resistance of at least one of the first part 601 or the second part 602, compared to a situation where the length L3 is equal to the length L4.

In an electric tool 10 according to a sixth aspect, which may be implemented in conjunction with any one of the third to fifth aspects, the high magnetic resistance portion R2, R3 includes a penetrating portion 63, 65, 68. The penetrating portion 63, 65, 68 penetrates through the rotor core 6 along an axis thereof.

This configuration may reduce the magnetic flux leaking from the rotor core 6.

In an electric tool 10 according to a seventh aspect, which may be implemented in conjunction with any one of the third to sixth aspects, the high magnetic resistance portion R2, R3 includes a thinned portion 604. The thinned portion 604 has a shorter dimension as measured along an axis of the rotor core 6 than parts, surrounding the thinned portion 604, of the rotor core 6.

This configuration may reduce the magnetic flux leaking from the rotor core 6.

In an electric tool 10 according to an eighth aspect, which may be implemented in conjunction with any one of the third to seventh aspects, the rotor core 6 is formed by stacking a plurality of steel plates 600 one on top of another in a thickness direction. The high magnetic resistance portion R3 is provided for each of two or more steel plates 600 selected from the plurality of steel plates 600. The two or more steel plates 600 are stacked one on top of another such that the respective high magnetic resistance portions R2, R3 of mutually adjacent steel plates 600 do not overlap with each other in the thickness direction.

This configuration contributes to increasing the mechanical strength of the rotor core 6 compared to a situation where the respective high magnetic resistance portions R3 of adjacent steel plates 600 overlap with each other in the thickness direction.

In an electric tool 10 according to a ninth aspect, which may be implemented in conjunction with any one of the first to eighth aspects, the rotor core 6 includes a void 69. The void 69 either penetrates through the rotor core 6 along an axis of the rotor core 6 or is depressed along the axis of the rotor core 6.

This configuration contributes to reducing the weight of the rotor core 6.

In an electric tool 10 according to a tenth aspect, which may be implemented in conjunction with any one of the first to ninth aspects, along the axis of the rotor core 6, both ends of the rotor core 6 are aligned with both ends of the stator core 20.

This configuration allows the length of the motor 1 as measured along the axis of the rotor core 6 to be shortened, compared to a situation where both ends of the rotor core 6 are misaligned with both ends of the stator core 20 along the axis of the rotor core 6.

Note that the constituent elements according to all aspects but the first aspect are not essential constituent elements for the electric tool 10 but may be omitted as appropriate.

REFERENCE SIGNS LIST

1 Motor
10 Electric Tool
20 Stator Core
5 Rotor
21 Output Shaft
6 Rotor Core
63, 65, 68 Penetrating Portion
69 Void
600 Steel Plate
601 First Part
602 Second Part
604 Thinned Portion
7 Permanent Magnet
C1 Center
L3 Length
L4 Length
R2, R3 High Magnetic Resistance Portion

The invention claimed is:

1. An electric tool including a motor, the motor comprising:
   a stator including a stator core and a plurality of coils;
   a rotor configured to rotate with respect to the stator core; and
   a coil bobbin,
   wherein:
   the rotor includes:
     a rotor core having a circular cylindrical shape;
     a plurality of permanent magnets; and
     an output shaft held inside the rotor core,
   the plurality of permanent magnets are arranged as spokes around a center of the rotor core,
   the stator core includes:
     an outer cylindrical portion having a circular cylindrical shape; and
     a central core arranged inside the outer cylindrical portion,
   the central core includes:
     an inner cylindrical portion having a circular cylindrical shape; and
     a plurality of teeth,
   the rotor is arranged inside the inner cylindrical portion,
   each of the plurality of teeth includes a body portion protruding outward from the inner cylindrical portion along the radius of the inner cylindrical portion,
   with the coil bobbin attached onto the central core and the coils wound around the body portion via the coil bobbin, the outer cylindrical portion is mounted onto the plurality of teeth,
   the rotor core includes a high magnetic resistance portion provided on a magnetic path of a magnetic flux generated by the plurality of permanent magnets,
   the high magnetic resistance portion has higher magnetic resistance than a portion, surrounding the high magnetic resistance portion, of the rotor core,
   the high magnetic resistance portion includes a thinned portion, the thinned portion has a shorter dimension as measured along an axis of the rotor core than parts, surrounding the thinned portion, of the rotor core,
the rotor core is formed by stacking a plurality of steel plates one on top of another in a thickness direction,
the plurality of steel plates include two or more steel plates having respective thinned portions constituting the thinned portion, and
the two or more steel plates are stacked one on top of another such that the respective thinned portions of mutually adjacent steel plates do not overlap with each other in the thickness direction.

2. The electric tool of claim 1, wherein
the rotor includes six or more permanent magnets as the plurality of permanent magnets.

3. The electric tool of claim 1, wherein
in at least one of the plurality of permanent magnets, at least part of the high magnetic resistance portion is provided for at least one of a first part or a second part, the first part and the second part being located on both sides of the at least one permanent magnet along a radius of the rotor core.

4. The electric tool of claim 3, wherein
the high magnetic resistance portion is provided for each of the first part and the second part, and
a length, measured along the radius of the rotor core, of the high magnetic resistance portion provided for the first part is different from a length, measured along the radius of the rotor core, of the high magnetic resistance portion provided for the second part.

5. The electric tool of claim 1, wherein
the high magnetic resistance portion includes a penetrating portion penetrating through the rotor core along the axis thereof.

6. The electric tool of claim 1, wherein
the rotor core includes a void which either penetrates through the rotor core along the axis of the rotor core or is depressed along the axis of the rotor core.

7. The electric tool of claim 1, wherein
along the axis of the rotor core, both ends of the rotor core are aligned with both ends of the stator core.

\* \* \* \* \*